United States Patent [19]

Crites

[11] 4,288,735
[45] Sep. 8, 1981

[54] VIBRATING ELECTRET REED VOLTAGE GENERATOR

[75] Inventor: Roger C. Crites, Florissant, Mo.

[73] Assignee: McDonnell Douglas Corp., Long Beach, Calif.

[21] Appl. No.: 75,881

[22] Filed: Sep. 17, 1979

[51] Int. Cl.³ .............................................. F23Q 3/01
[52] U.S. Cl. .................................. 322/2 A; 307/400; 361/258; 431/255
[58] Field of Search ............... 431/255; 361/258, 259, 361/260; 322/2 R, 2 A; 307/400

[56] References Cited

U.S. PATENT DOCUMENTS

| | | | |
|---|---|---|---|
| 309,971 | 12/1884 | Molison | 310/310 X |
| 324,010 | 8/1885 | Clarke | 310/310 |
| 1,360,654 | 11/1920 | Littlefield | 310/309 X |
| 2,346,704 | 4/1944 | Ray | 361/258 X |
| 2,526,642 | 10/1950 | Del Campo | 310/310 |
| 2,685,654 | 8/1954 | Mennesson | 361/258 X |
| 2,817,777 | 12/1957 | Mennesson | 310/309 |
| 3,172,456 | 3/1965 | Glasgow et al. | 431/255 X |
| 3,247,886 | 4/1966 | Mitchell | 431/255 X |
| 3,344,835 | 10/1967 | Hodgson | 431/255 X |
| 3,519,009 | 7/1970 | Rubin | 310/332 |
| 3,562,562 | 2/1971 | Kreuter | 431/255 X |
| 3,736,436 | 5/1973 | Crites | 307/400 |
| 3,865,539 | 2/1975 | Burge et al. | 431/255 |
| 3,890,511 | 6/1975 | Haugsjaa et al. | 307/106 |
| 3,927,354 | 12/1975 | Bauser et al. | 431/255 X |
| 4,031,405 | 6/1977 | Asperger | 290/55 |
| 4,205,242 | 5/1980 | Micheron et al. | 307/400 |

FOREIGN PATENT DOCUMENTS 1399251 7/1975 United Kingdom ............... 307/400

OTHER PUBLICATIONS

"Electrstatic Motors," *The Physics Teacher*, Mar. 1971, pp. 121–129, Jefimenko et al.

"Electrets Get New Look," *Product Engineering*, Feb. 10, 1969, pp. 62–64, Gardner.

*Primary Examiner*—Robert J. Hickey
*Attorney, Agent, or Firm*—Paul T. Loef; George W. Finch; Donald L. Royer

[57] ABSTRACT

A vibrating electret reed voltage generator. The reed vibration is induced by fluid pressure supplied to the reed chamber and controlled through a fluid oscillating circuit.

10 Claims, 3 Drawing Figures

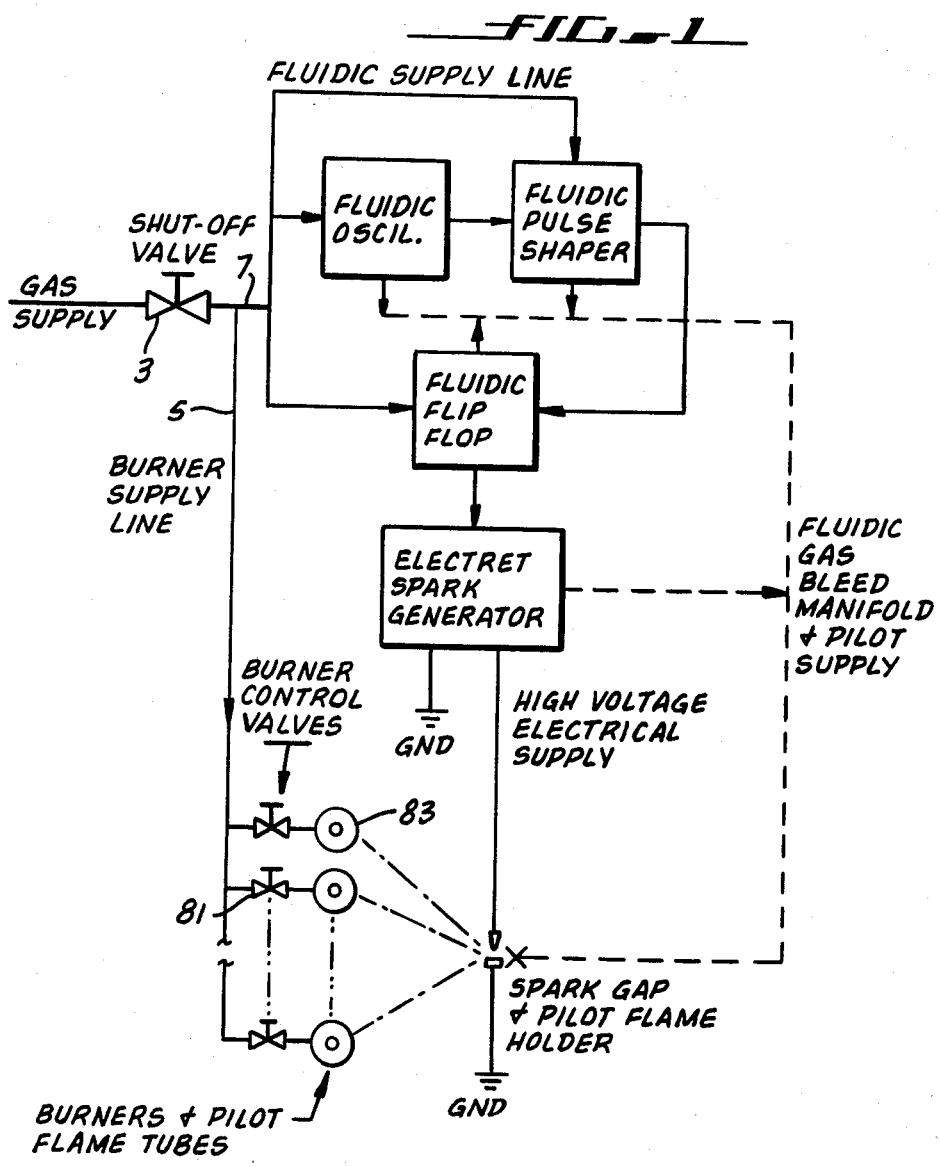

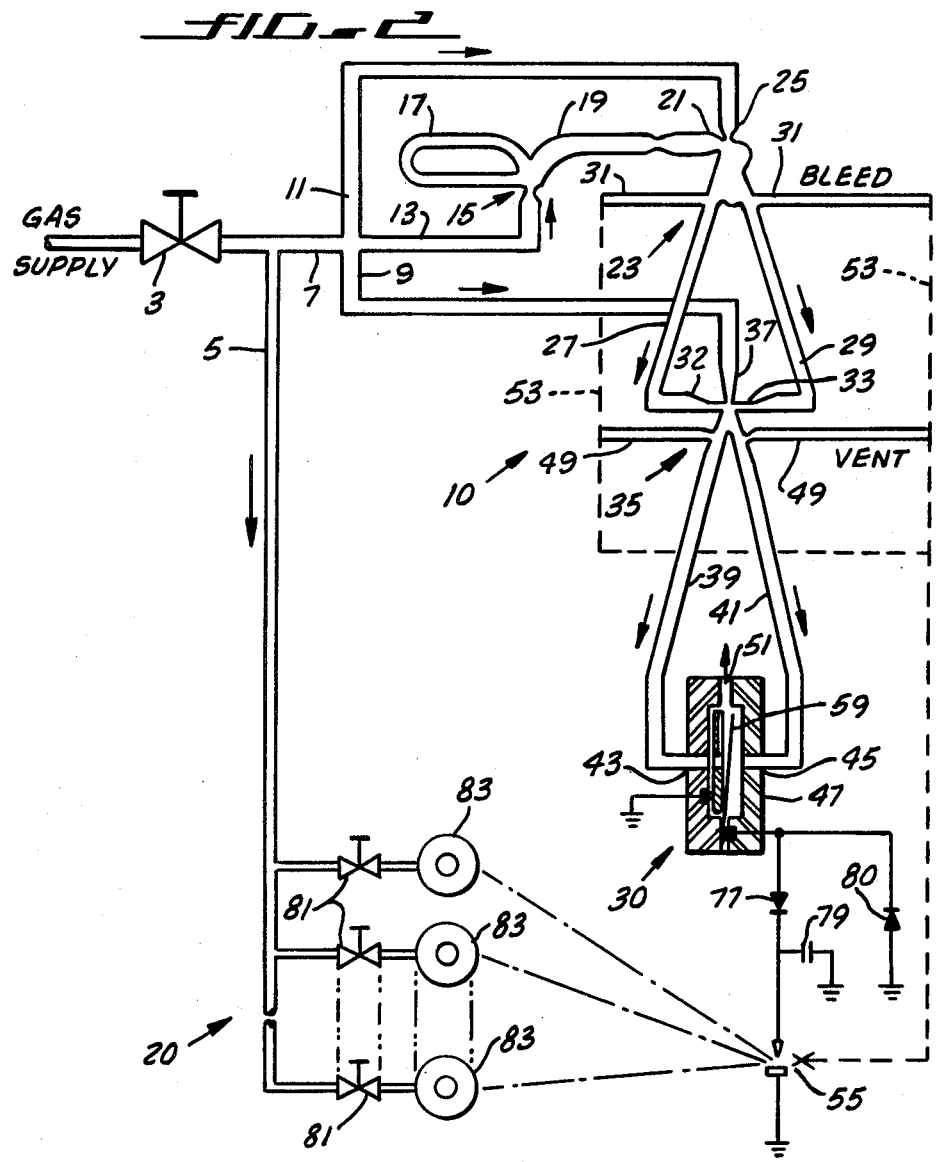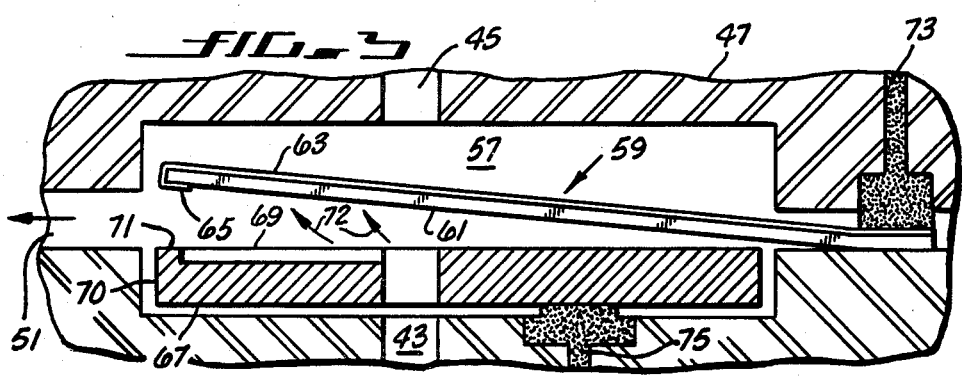

VIBRATING ELECTRET REED VOLTAGE GENERATOR

BACKGROUND OF THE INVENTION

This invention relates to electret voltage generators in general, and more specifically to a vibrating electret reed type voltage generator, and still more specifically to a vibrating reed type voltage generator driven by a fluidic oscillator.

By definition, electrets are polarized dielectrics. Material that will accept and hold, for what may be a very long time, an electric charge. Since the material is volume charged, as opposed to surface charged, the charge may be very large.

An electret placed between a pair of metal plates becomes a condenser and since the electret charge is constant, any change in capacitance results in a change in voltage, or vice versa.

Most of the electret applications have been confined to the condenser-transducer type either as a microphone or as a pressure transducer as taught in U.S. Pat. No. 3,736,436 issued to the inventor herein. These applications involve variations in voltages which are amplified rather than the production of electrical power. However, U.S. Pat. No. 2,526,642 to Del Campo, U.S. Pat. No. 3,927,354 to Bauser et al and U.S. Pat. No. 3,890,511 to Haugsjaa et al all produce power by rapidly removing the electrical field by separating the plates or conductors. None of these devices employ a vibrating reed nor are they actuated by a fluidic oscillator.

It is the object of the present invention to generate a high electrical voltage with no moving parts other than a vibrating electret reed.

It is a further object of the present invention to drive the electret generator directly from the flow of the fluid in a captive fluidic device.

SUMMARY OF THE INVENTION

In accordance with teachings of the invention, a flexible electret reed is supported at one distal end in a housing so as to be free to vibrate. The high voltage electrode is formed integrally with the reed. A thin conductive coating is deposited on one side of the reed which continues around the free distal end and coats a small portion of the opposing side of the reed to serve as a grounding tab. A ground electrode is mounted in spaced, facing relationship to the side of the electret reed having the grounding tab. The electret reed is made to vibrate by fluid pressure supplied to the reed housing through a fluidic oscillating circuit. Full vibratory excursion of the electret reed is such that the grounding tab contacts the ground electrode once each cycle, and also maintains such contact when inactive.

DESCRIPTION OF THE DRAWINGS

FIG. 1 is a simplified block diagram of an electret gas ignition system having a fluidic oscillating circuit driving the electret generator in accordance with the invention;

FIG. 2 is a schematic diagram of a fluidic oscillating circuit driving the vibrating reed electret generator in accordance with the invention to ignite a gas burner; and FIG. 3 is an enlarged view of the vibrating reed electret generator of FIG. 2 with the perimeter portion of the housing cut away.

DESCRIPTION OF THE PREFERRED EMBODIMENT

FIG. 1 is a simplified block diagram of a pilotless gas ignition system employing a vibrating electret reed voltage generator wherein the reed vibration is actuated by fluid pressure supplied to the reed chamber through a fluidic oscillating circuit. The combustible gas is supplied through a quick opening shut-off valve after which it splits into two legs, one leg of which forms the burner supply line 5 and the other forms the fluidic supply line 7. When the quick opening shut-off valve 3 is opened, gas flows into the fluidic oscillator which produces a roughly sinusoidal fluctuating output. The fluctuating output flow is passed through a pulse shaper which is a high hysteresis device to increase the transition slew rate. The shaped output, in turn, drives a flip flop at the clock rate established by the oscillator. The flip flop output, which is a square wave in form, excites the electret spark generator which produces a high voltage potential for use in the spark gap. The fluidic bleed flow, which is shown in the broken line, is collected to form the pilot light supply. The pilot is ignited at the spark gap, which then serves as a conventional pilot light to the burners.

Conventional burner control from the pilot flame holder to the burners is indicated by the reference lines which control the burner control valves to prevent gas flow when there is no pilot flame.

A more detailed description of both the fluidic circuit and the electret voltage generator are shown in FIG. 2. The quick opening shutoff valve 3 supplies gas to both the burner circuit 20 at the inlet 5 and the fluidic oscillator circuit 10 at the inlet 7. The fluid is shown as a combustible gas since it is used in conjunction with burners, however, it may be used with any gas depending on the end use of the electret voltage generator. The circuit inlet 7 divides into three alternate paths 9, 11, and 13. One path 13 leads to one portion of the fluidic circuit herein denoted as a first fluidic device or a self-excited, pressure insensitive, fluidic oscillator 15. The input channel to the fluidic oscillator 15 divides into a feedback channel 17 and an output channel 19 which terminates in an output port which is connected to the control port 21 of the second fluidic device, a cusp half adder 23.

One of the three alternate inlet paths 11 is connected to the gas input supply port 25 of the cusp half adder 23 which has two outlets 27 and 29 and a pair of bleed ports 31. The function of the cusp half adder 23, which is a high hysteresis device, is to reshape the fluctuating and roughly sinusoidal output of the fluidic oscillator 15 by increasing the transition slew rate.

The alternate circuits 27 and 29 of the cusp half adder 23 are connected to the alternate and opposing control input ports 32 and 33 of the third fluidic divice called a bi-stable amplifier 35 used in this circuit as a flip-flop and may be so identified.

A third alternate circuit inlet path 9 is connected to the gas supply support 37 of the flip-flop 35. Flip-flop 35 has two outputs 39 and 41 which are connected to alternate ports 43 and 45 on the body 47 of the electret voltage generator 30. The flip-flop 35 has a pair of vents 49 and along with the pair of bleeds 31 from the cusp half adder 23 and the vent 51 from the electret voltage generator 30 are manifolded to form the pilot supply 53 (broken lines) for the pilot light (not shown) at the spark gap 55.

It should now be readily seen that the output of the fluidic oscillator 15, which is a fluctuating flow roughly sinusoidal in wave shape, is connected to the control port 21 of the cusp half adder 23 which produces a pair of shaped alternately pressurized outputs 27 and 29 which are connected to the control ports 32 and 33 of the flip-flop 35. These alternate shaped output pulses drive the flip-flop 35 at the clock rate established by the oscillator 15 to produce a square wave output from the flip-flop which is applied to excite the electret spark generator 30.

The body 47 of the electret voltage generator 30 contains a cavity 57 which houses a reed 59 supported on one end and free to vibrate, see FIG. 3. The reed 59 is composed of an electret 61 which is made from a thin sheet of suitable electret material such as FEP Teflon or K-1 Polycarbonate polarized to retain a charge suitable for the specific application. Typically the electret would be in the range of 0.5"×1"×0.010" thick. A very thin conductive layer 63, such as vacuum deposited gold or aluminum, is placed on one entire side of the electret material 61, enveloping the free end of the electret material and continuing around to cover a small portion of the opposing side and forming a shorting tab 65. The high voltage electrode is formed by the entire conductive layer 63. Further, this arrangement shields the electret 61, when not vibrating, similar to a soft metal keeper on a permanent magnet. An electret properly shielded in this fashion will last indefinitely.

Opposite the shorting tab 65 side of the electret 61 and in spaced relationship is the ground electrode 67. A portion of the ground electrode 67 is removed between the inlet port 43 and the distal end 70 of the electrode. The distal end is left intact to contact the shorting tab 65 leaving a cavity 69 to form a flow channel and a contacting portion 71. The small flow channel insures that the shorting tab 65 connection to ground is broken cleanly as the reed 59 begins to lift. Gas flow is as indicated by the arrows 72.

The inlet ports 43 and 45 are located on the longitudinal centerline of the reed 59 but displaced from center toward the free end of the reed 59 so as to better excite the reed. A high voltage terminal is provided at 73 and a ground terminal at 75, which again, need not necessarily connect to ground depending on the application.

The alternate pulses of gas generated by the flip flop 35 applied to the alternate ports 43 and 45 of the electret voltage generator 30 excite the reed 59 to vibrate. The motion may be aided by the natural vibrational characteristics of the reed in a stiff reed design. Alternatively, the motion may be induced by pressure forces alone in a floppy reed design.

Shorting tab 65 contacts the contacting portion 71 of the ground electrode once each cycle. At this time in each cycle the shorting tab 65 and/or a ground referenced diode 80 provides the conductive path whereby the high voltage electrode 63 receives an induced electrical charge due to the field of the electret. This occurs at zero voltage. Since the electret charge is constant, and since the induced charge on the high voltage electrode is isolated as the reed moves away from the ground electrode, the voltage on the high voltage electrode rises rapidly as the capacitance of the high voltage electrode decreases.

In the specific embodiment shown, the high voltage terminal 73 is connected to a high voltage diode 77 and a ground reference diode 80 (FIG. 2) which is in turn connected to one plate of a high energy capacitor 79 while the other plate of the capacitor is connected to ground. When the voltage on the reed electrode 61 exceeds that on the capacitor 79, the diode 77 becomes forward biased. This occurs sometime after the shorting tab 65 leaves the ground electrode 67 since the voltage on the high voltage electrode 63 increases rapidly with the mean distance between the two electrodes. Hence the charge q on the high voltage electrode 63 is pumped into the energy storage capacitor 79, raising its voltage. By the time the reed 59 reaches its limit of travel away from the ground electrode 67 most of the charge q has been transferred from the reed electrode 63 to the capacitor 79.

As the reed 59 reverses its travel toward the ground electrode, the voltage on the reed electrode 63 decreases rapidly. Since the charge q has been transferred to the energy storage capacitor, the reed electrode 63 swings negative in response to the now unbalanced field generated by the electret material 61 in the reed 59. When the shorting tab 65 contacts the ground electrode 67, the reed electrode 63 is grounded and a current will flow replacing the charge q on the reed electrode 63 and returning it to zero voltage.

Alternatively, as the voltage swings negative, the ground reference diode 80 becomes forward biased and the charging of the reed electrode 63 is accomplished independently of the shorting tab 65. In this alternative, the charging of the reed electrode 63 occurs at a very low voltage and eliminates the sparking at the shorting tab 65 which occurs if the diode 80 is excluded. The shorting tab 65, although not essential to proper functioning when the ground reference diode 80 is in the circuit, is still desirable to achieve the "keeper" effect previously discussed.

In any case, the energy capacitor 79 will continue to build up energy until it reaches a critical point at which time it will discharge through the spark gap 55 lighting the gas at the pilot light (not shown) as previously discussed.

Burner circuit 20 is conventional, but burner control valves 81 interlock with the pilot light so as to prevent opening when the pilot light is not burning. Typical burners are shown at 83. It should now be reasonably clear that the electret generator will function without the shorting tab 65 or the diode 80, but inefficiently. If the reed 59 vibrates without touching the ground electrode A.C. power is produced. If the high voltage electrode 63 touches the ground electrode 67 on each vibratory cycle, a pulsed D.C. power is produced. In the preferred embodiment, where the shorting tab 65 touches the ground electrode 67 each cycle and the ground reference diode 80 is employed, the vibrating reed acts as a current pump producing a pulsed D.C. current to charge a storage capacitor. The reed, fluidic clock rate, and capacitor may be varied to provide the power required for energizing or switching CMOS electronics, producing ignition sparks or for other uses.

By way of example, consider an array of four reeds, each having an effective surface area of 0.5 sq. inches (0.5 inches×1 inch). Let the fluidic clock rate be 1 KHz. Polycarbonate (K-1) will be the reed material having a surface charge density of about 90 $(10^{-6})$ $C/m^2$. These reeds will collectively pump about $10^{-7}$ C. of charge per cycle, i.e. 0.1 mA of current. If this charge is collected in a 0.05. F capacitor, an electric potential of 2000 volts will be obtained in about 1 second. With a spark gap of 0.04 inches, roughly one spark per second will result. Spark rate, voltage, and energy are controlled by the selection of the total reed area, clock rate, storage capacitor, and spark gap.

Thus there is shown a preferred embodiment for the electret voltage generator driven by gas flow, controlled by a fluidic circuit and having no moving parts other than a vibrating electret reed contained in a captive fluidic device. The vibrating electret reed voltage generator produces a high voltage suitable for ignition or other purposes.

The forgoing description is intended to be illustrative only and is not limitive of the invention. The scope of the invention is intended to be limited only by the claims appended hereto.

What is claimed is:

1. A vibrating electret reed voltage generator, comprising:
    a flexible electret reed supported at one distal end and having first and second opposing major surfaces;
    a high voltage electrode formed by coating said first major surface of said electret reed with a thin conductive coating;
    a ground electrode spaced opposite said second major surface of said electret reed so that said second major surface contacts said ground electrode at full amplitude of the vibratory excursion of said electret reed;
    a high voltage terminal connected to said high voltage electrode;
    a ground terminal connected to said ground electrode; and
    means to vibrate said electret reed whereby electrical power is produced with each vibratory cycle of said electret reed.

2. The vibrating electret reed voltage generator as recited in claim 1, further comprising a ground reference diode connecting said high voltage electrode to ground whereby said diode becomes forward biased when the voltage on said high voltage electrode swings negative allowing the charging of said high voltage electrode.

3. The vibrating electret reed voltage generator as recited in claim 2, wherein said high voltage electrode continues around the unsupported distal end of said electret reed to cover a small portion of the distal end of said second major surface so as to form a shorting tab.

4. The vibrating electret reed voltage generator as recited in claim 1, wherein said ground electrode has a raised portion opposite said shorting tab.

5. The vibrating electret reed voltage generator as recited in claim 4, wherein said shorting tab contacts said ground electrode when said reed is not vibrating so as to protect said electret from ions in the air.

6. The vibrating electret reed voltage generator as recited in claim 1, wherein said means to vibrate said electret reed is a fluid controlled by a fluidic oscillator circuit.

7. The vibrating electret reed voltage generator as recited in claim 6, wherein said high voltage terminal is connected to a high voltage diode followed by a capacitor which in turn is connected to a spark gap.

8. The vibrating electret reed voltage generator as recited in claim 6, wherein said flexible electret reed is mounted in a non-conductive housing having a cavity with a pair of opposing ports directed at either side of said electret reed and connected to the output of said fluidic oscillator circuit whereby said electret reed is caused to vibrate.

9. The vibrating electret reed voltage generator as recited in claim 6 wherein said fluidic oscillator circuit comprises:
    a fluidic oscillator to produce a pulse;
    a fluidic pulse shaper to shape said pulse; and
    a fluidic flip-flop, driven by said shaped pulse so as to produce alternating pulses suitable to drive said electret reed voltage generator.

10. The vibrating electret reed voltage generator as recited in claim 8 wherein said fluidic oscillator circuit comprises:
    a self-excited, pressure insensitive fluidic oscillator to produce a pulse;
    a cusp half adder to receive and shape said pulse; and
    a bi-stable amplifier used as a fluidic flip-flop driven by said shaped pulse to produce alternating pulses suitable to drive said electret reed voltage generator.

* * * * *